US008661429B2

(12) United States Patent
Ruster et al.

(10) Patent No.: US 8,661,429 B2
(45) Date of Patent: Feb. 25, 2014

(54) UPDATING PERIPHERAL DEVICE FIRMWARE VIA A PORTABLE DEVICE

(75) Inventors: Jean-Pierre Ruster, Sunnyvale, CA (US); Chandra S. Buddhavaram, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/407,482

(22) Filed: Feb. 28, 2012

(65) Prior Publication Data
US 2013/0227540 A1 Aug. 29, 2013

(51) Int. Cl.
*G06F 9/44* (2006.01)

(52) U.S. Cl.
USPC .......................................... 717/173

(58) Field of Classification Search
USPC ............... 726/4; 713/2; 710/6, 8; 714/5.1; 717/168, 171, 172–173
See application file for complete search history.

(56) References Cited

U.S. PATENT DOCUMENTS

| 6,732,195 | B1 * | 5/2004 | Baldwin ........................... 710/6 |
| 6,930,785 | B1 | 8/2005 | Weyand et al. |
| 7,225,251 | B2 | 5/2007 | Suzuki |
| 7,249,353 | B2 | 7/2007 | Zarco |
| 8,214,821 | B1 * | 7/2012 | Bartel et al. ................... 717/168 |
| 8,219,794 | B1 * | 7/2012 | Wang et al. ........................ 713/2 |
| 2002/0178234 | A1 * | 11/2002 | Birchley ........................ 709/217 |
| 2003/0217124 | A1 | 11/2003 | Parry |
| 2004/0015923 | A1 * | 1/2004 | Hemsing et al. ............... 717/154 |
| 2006/0150177 | A1 | 7/2006 | Liu et al. |
| 2007/0055970 | A1 | 3/2007 | Sakuda et al. |
| 2009/0077634 | A1 * | 3/2009 | Hung ................................ 726/4 |
| 2009/0094414 | A1 | 4/2009 | Hsu et al. |
| 2011/0035741 | A1 | 2/2011 | Thiyagarajan |
| 2011/0128158 | A1 | 6/2011 | Chou |
| 2012/0291021 | A1 * | 11/2012 | Banerjee et al. ............... 717/173 |

* cited by examiner

*Primary Examiner* — Tuan A Vu

(74) *Attorney, Agent, or Firm* — Hollingsworth Davis, LLC

(57) ABSTRACT

An application running on a portable device detects a firmware update for a peripheral device. The firmware update is available via an external network. The firmware update is downloaded to the portable device from the external network via the application, and the firmware update is uploaded to the peripheral device from the application via a proximity network. The firmware update is uploaded via an application program interface of the peripheral device that facilitates applying the update in response to the uploading of the firmware.

9 Claims, 6 Drawing Sheets

UPDATING PERIPHERAL DEVICE FIRMWARE VIA A PORTABLE DEVICE

SUMMARY

The present disclosure is related to systems and methods for updating firmware. For example, in one embodiment, a method, apparatus, and/or computer readable medium facilitate detecting, via an application running on a portable device, a firmware update for a peripheral device. The firmware update is available via an external network. The firmware update is downloaded to the portable device from the external network via the application, and the firmware update is uploaded to the peripheral device from the application via a proximity network. The firmware update is uploaded via an application program interface of the peripheral device that facilitates applying the update in response to the uploading of the firmware.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to apparatuses, systems and methods that enable updating of firmware on a peripheral device. The term "firmware," as used herein, may include any combination of program instructions and data that together provide an execution environment for a class of devices (e.g., devices related by one or more of a part number, model number, hardware version, serial number range, etc.) As such, a particular version of firmware (and updates thereof) can be applied to all devices of a particular class of devices for which the firmware is developed.

Firmware can be contrasted with user data, which includes data that may be unique to the device, such as settings, configurations, user-created data, user-added files, etc. User data can be added, deleted, and changed at any time by the user, and may be considered separately from the firmware for purposes of the following discussion. A firmware update may change or replace peripheral device firmware without affecting the user data, regardless of whether the user data is stored on the same data storage media as the firmware.

Among other things, firmware is often associated with embedded devices. Embedded devices include special purpose devices that may not have facilities that allow a user to extend add, change, or delete programs operating on the device. It should be noted that the embodiments herein need not be limited to embedded or special-purpose devices. For example, some general-purpose computing devices (e.g., desktop computers, mobile computing devices) may include hardware that includes firmware, such as basic input-output system (BIOS) and peripheral device (e.g., hard drives, optical drives). These devices can be updated separately from a general-purpose operating system that operates on the devices, and may be updated under similar circumstances (e.g., the updated device lacking a user interface and/or network connectivity).

Figure 1:
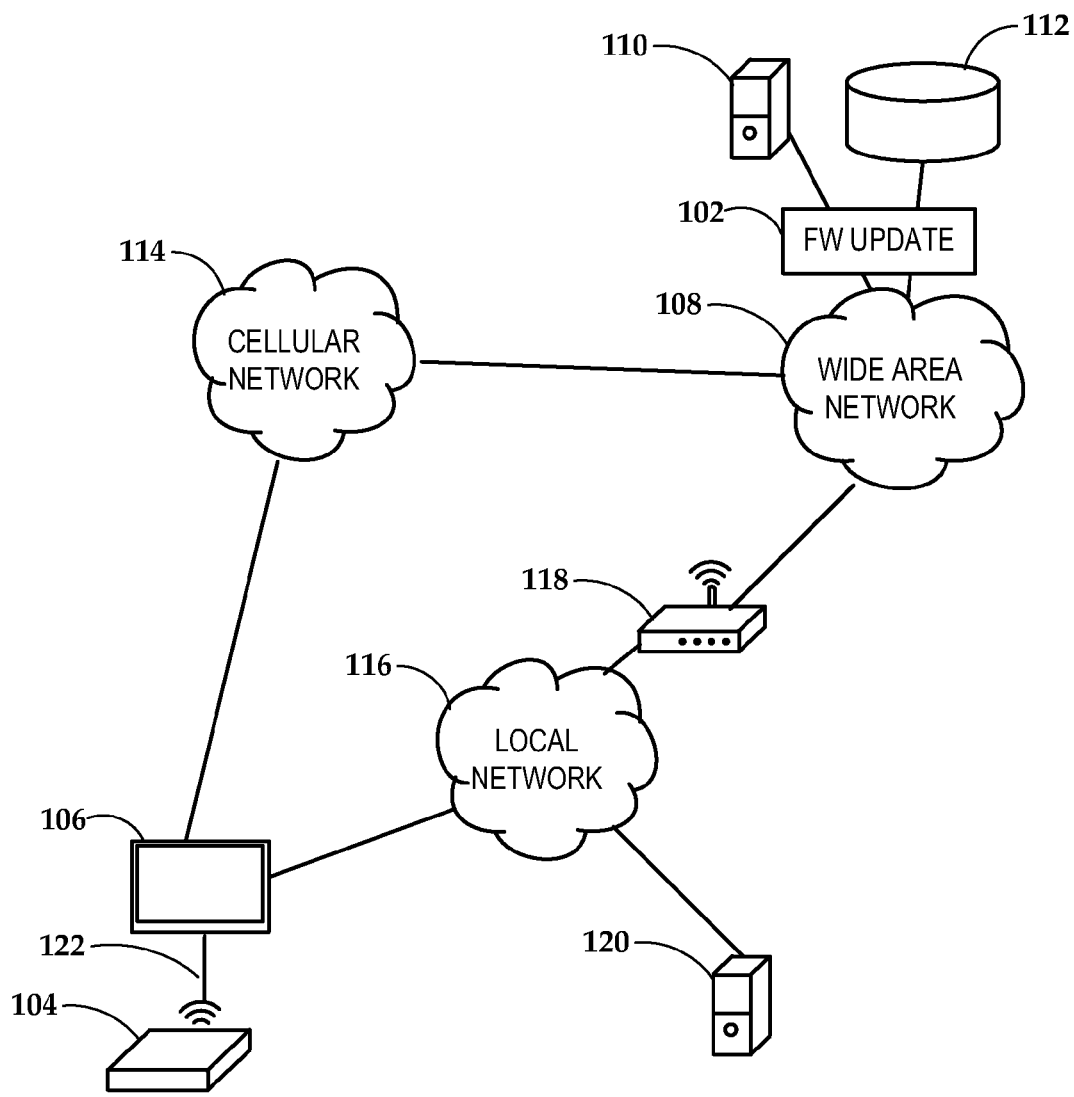
FIG. 1 is a block diagram of an arrangement of devices and networks according to example embodiments.

In reference now to FIG. 1, a block diagram illustrates an arrangement of networks and devices according to an example embodiment. The arrangement generally facilitates applying a firmware update 102 to peripheral device 104 via a mobile device 106. For example, the peripheral device 104 may include a network attached storage (NAS) drive that provides data storage for the portable device 106. The portable device 106 may include a smart phone, media player, tablet computer, laptop computer, etc., and may use the peripheral device 104 to extend functionality of the portable device 106, e.g., to provide mass data storage in cases where the peripheral device is configured as an NAS device.

In this example, the firmware update 102 is available via a wide area network 108, which may include public networks such as the Internet. A server 110 and/or database 112 may be accessed in order to provide the update 102, and/or to learn about the update 102, including applicability of the update, where to download, validation data (e.g., hash, checksum) etc. The server 110 and/or database 112 may include network hosts accessible by uniform resource locators (URLs) and may use existing protocols to provide the update 102 and/or information about the update 102. These protocols may include hypertext transport protocol (HTTP), file transfer protocol (FTP), distributed download protocols (e.g., Bittorrent), etc., and may run atop more basic network protocols, such as transport control protocol/Internet protocol (TCP/IP).

The portable device 106 may access the wide-area network 108 directly, or via one or more intermediary networks 114, 116. Intermediary network may be a cellular network, which includes any private or public infrastructure that provides wireless data access to mobile devices. The cellular network 114 may be "public" in the sense that it may be available over a large geographical area, although may require an account with the carrier in order to use the network. The cellular network may use cellular data technologies such as code-division multiple access (CDMA), Global System for Mobile Communications (GSM), WiMax, etc., and may have data transfer capabilities that are generally characterized as 2G, 3G, 4G, etc.

The local network 116 may be a private network that is limited in geographic reach (e.g., within a single home, building, office, etc.). A device such as a gateway/router 118 may couple devices of the local network 116 to the wide area network 108. The gateway/router 118 may be configured as a network address translation (NAT) firewall that enables multiple devices (e.g., portable device 106 and desktop computer 120) to share a common address on the wide-area network 108. The gateway/router 118 may also have other capabilities, such as the ability to act as wireless access point, Ethernet switch/hub, etc., that couples together some or all devices 106, 120 on the local network 116.

In the illustrated example, the portable device 106 and peripheral device 104 are able to communicate with each other using a proximity network technology, as represented by wireless link 122. This link 122 may utilize technologies such as wireless local area networking (WLAN), Bluetooth, etc., that can facilitate wireless communications between two or more devices. Generally, because the peripheral device 104 may be a portable device designed for use with another portable device 106, it may be natural for a user to locate the devices 104, 106 in proximity to one another. As a result, the link 122 may be referred to herein as a "proximity network," even though the technology used to implement the link (e.g., WLAN) need not be range-limited to visual proximity.

While the proximity network 122 may utilize general-purpose networking protocols, the proximity network 122 may be specially configured to suit the needs of the peripheral device 104 instead of acting as a general-purpose network. For example, the peripheral device 104 may act as a WLAN access point (AP), which enables the portable device 106 to easily discover, connect to, and communicate with the peripheral device 104. In such an arrangement, the peripheral device 104 can advertise the AP using an appropriate service set identifier (SSID). The SSID can be found using the WLAN connection features integrated with the portable device 106, thereby facilitating connection between the devices 104, 106 without requiring special software and with minimal effort on the part of the user.

One issue that may arise with the use of the proximity network 122 is that the peripheral device 104 may not be able to directly use this link 122 for self-maintenance, e.g., updating firmware. For example, if the peripheral device 104 is configured as a wireless AP, the peripheral 104 takes the place of an infrastructure device such as gateway/router 118 even if it doesn't have the capability to access outside networks 108, 114, e.g., is lacking an external network interface. Even if the peripheral device 104 is able to access outside networks 108, 114, maintenance such as firmware updates may require user interaction, and device may not have a user interface suitable for this task. For example, in order to avoid corrupting an update of flash memory, the user may be required to place a battery powered peripheral device 104 on AC power in order to prevent an unexpected shutdown during the update. Also, it may be desired that the user to know if and when a firmware update is being applied, e.g., in case the update causes problems, or adds new features the user should be aware of.

Figure 2:
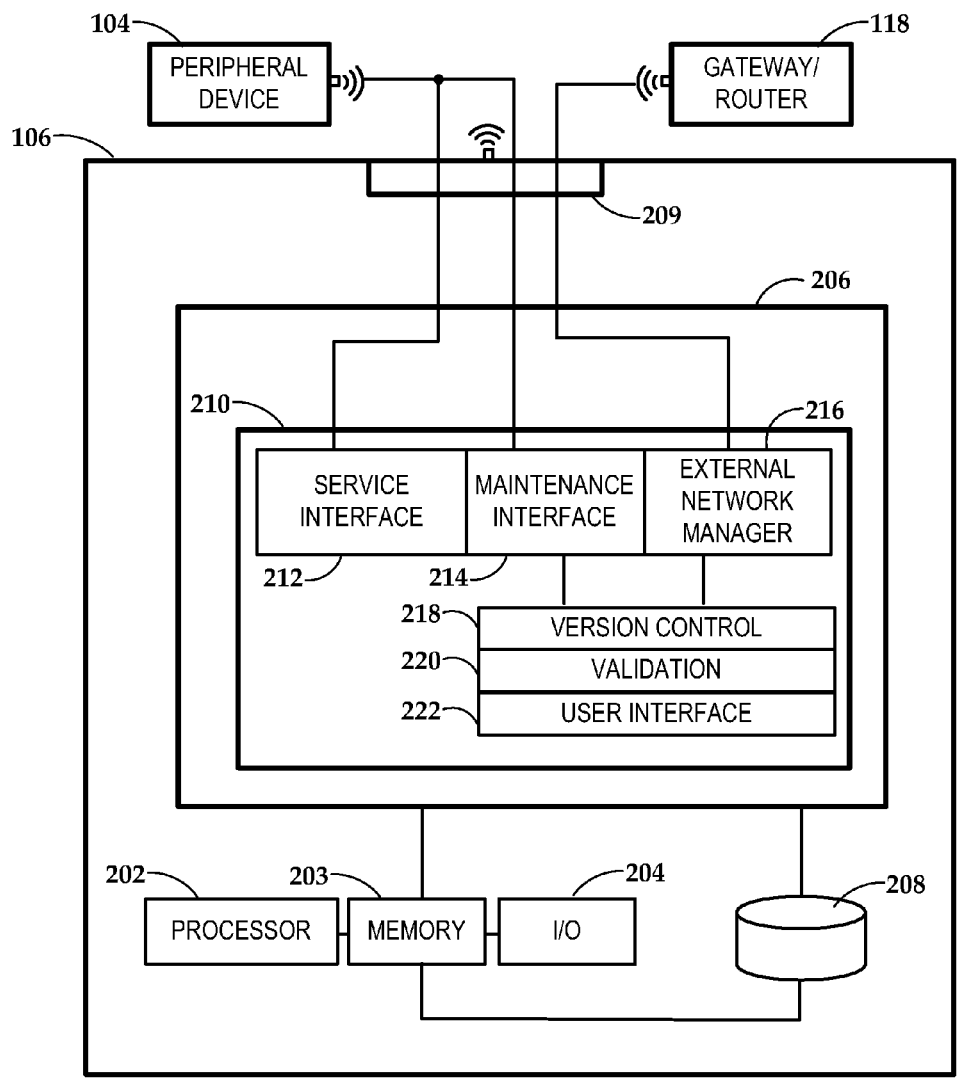
FIG. 2 are user interface screens illustrating user configuration of a peripheral device according to an example embodiment.

For these and other reasons, the portable device 106 may include facilities for updating firmware (or other maintenance operations) of the peripheral device 104. An example embodiment of a portable device 106 is shown in the block diagram of FIG. 2. The device 106 may include computing hardware, including a processor 202, memory 203, and input-output (I/O) circuitry 204. The memory 203 may include both volatile and non-volatile memory for storing both data and instructions. The I/O circuitry 204 may include and/or be coupled to one or more network interfaces 209, e.g., wireless LAN and/or cellular interface.

In this figure, a portion of memory 203 includes a computer readable medium 206 that stores functional modules. The medium 206 may include non-volatile memory such as magnetic disks, flash memory, read-only memory (ROM), etc., as well as volatile random access memory (RAM). The memory 203 may also include a second computer readable medium 208, which is represented here as a database. Generally, the first computer readable medium 206 include instructions and data (e.g., functional modules 206) that are to be executed on the portable device 106, while the database 208 may store, among other things, data targeted for use by the peripheral device 104.

An example functional module 210 is shown stored in medium 206. This module 210 may include one or more programs, applications, libraries, applets, etc., that are designed to interface the portable device 106 with the peripheral device 104. The module 210 may include a service interface 212 that facilitates using the primary functions of the peripheral device 104 via a proximity network. In an arrangement where the peripheral 104 is an NAS, for example, the interface 212 may facilitate access to user directories and files stored on the NAS. Or, if the peripheral 104 is a media rendering device (e.g., speaker and/or display), the interface 212 may facilitate formatting and sending of media to the peripheral 104.

The module 210 also contains a maintenance interface 214 for interacting with the peripheral device 104. This interface 214 may provide functions such as performing setup, changing settings, authentication, and other aspects of managing the peripheral device 104 that are not directly related to performance of its primary functions via service interface 212. This interface 214 can also be used for applying firmware updates to the peripheral device 104 as described herein. For example, the maintenance interface 214 may be configured, either alone or together with the service interface 212, as an application program interface (API) of the portable device 106 that facilitates applying firmware updates to the peripheral device 104 in response to the firmware updates being uploaded to the peripheral device 104.

The firmware update functionality of maintenance interface 214 may include functions such as checking of a current version on peripheral device 104, determination of other versions available via external networks, validation of downloads, authentication with external entities and/or peripheral device 104, and communication of status to user. These functions are represented by example sub-modules 218, 220, and 222, and by an external network manager 216 that facilitates access of firmware and other relevant data via external networks. In this context, an external network may include any network that cannot be accessed by the peripheral device 104. So external networks may include public networks accessible via gateway 118, as well as local network nodes not directly accessible from a proximity network by peripheral device 104.

The external network manager 216 may perform discovery, querying, and other communications with one or more external data sources that act as centralized authority for updating a population of devices, the peripheral device 104 being included in that population. The manager 216 may use existing protocols for obtaining updates such as HTTP, FTP, etc., as well as obtaining metadata related to the updates (e.g., version numbers, text descriptions, checksum/hash values). The manager 216 may occasionally poll the external data sources, or use some other mechanism to determine new updates and other content.

The external network manager 216 may also report data back to the external data sources, such as current versions used, success or failure of updates, error codes, etc. This report data can be used to determine problems with updates and/or the functional module 210 itself and assist in finding solutions. For example, if updates are not being downloaded or applied at an expected rate, it may be determined from report data that this is due to users not being effectively informed about the availability or the need for updates (e.g., dialogs being immediately dismissed without applying update). In response, the user interface 222 may be updated to better communicate the need for and availability of firmware updates for peripheral device 104.

The version control sub-module 218 may perform actions related to determining whether or not an update should be performed. This may involve comparison of current versions with available versions, reference to user preferences/policies, tracking and/or storing old versions for purposes of reverting, etc. The validation sub-module 220 may ensure integrity of files and metadata (e.g., by using hashes, checksums, authentication keys), manage authentication between the maintenance interface 214 and the peripheral device 104, manage authentication between the external network manager 216 and external data sources (e.g., elements 110, 112 in FIG. 1), assemble uploads/downloads of data from different sessions and/or from different locations, etc.

The user interface sub-module 222 facilitates user control over some aspects of the maintenance processes. For example, the user may be able to create policies that determine when and how firmware updates are applied. The peripheral device 104 may require user authentication before applying an update, and the user interface sub-module 222 may facilitate entry of passwords, biometrics, etc., in support of this authentication. Similarly, access to external data sources may also require authentication, which can be facilitated via sub-module 222.

It should be noted that the maintenance interface 214 may operate cooperatively with or be integrated into the service interface 212. For example, if the peripheral device 104 is an NAS, updates to firmware may be achieved by copying one or more files to a special folder using the network file system protocols used to manage user files on the NAS. The locations used to store this data may be hidden from the user, and may require special privileges to access via the service interface 212. Similarly, if the peripheral device 104 is another type of apparatus (e.g., media renderer, printer, user input device) the data can be sent over the service interface 212 as if it were the service data (e.g., video frame, print job, feedback signals) but with indications that the peripheral should handle the data differently. Use of the service interface 212 can leverage already proven data transfer mechanisms to provide added functionality provided by the maintenance interface 214.

Figure 3:
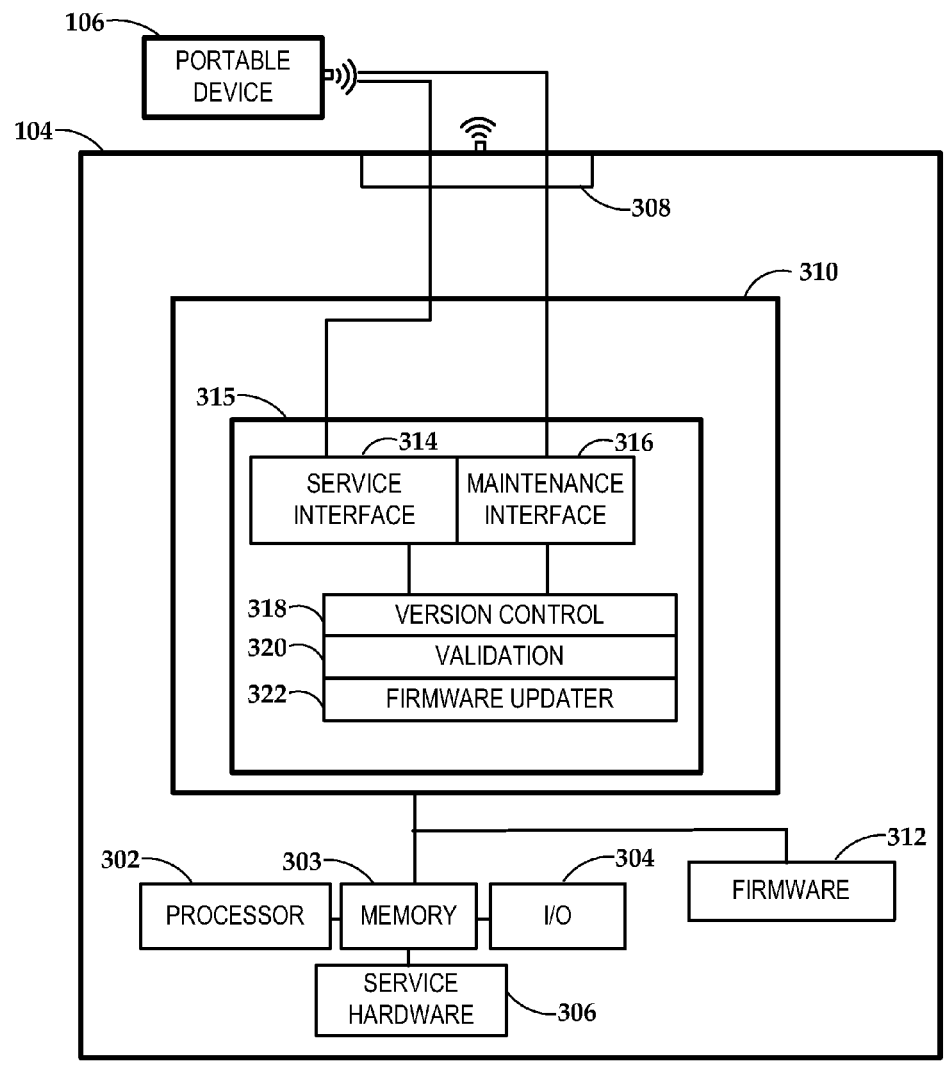
FIGS. 3 and 4 are flowcharts of procedures according to example embodiments.

In reference now to FIG. 3, a block diagram illustrates a peripheral device 104 according to an example embodiment. The peripheral device 104 may include computing hardware, including a processor 302, memory 303, input-output (I/O) circuitry 304, and service hardware 306. The I/O circuitry 304 may include and/or be coupled to a network interface 308, e.g., wireless LAN interface. The service hardware 306 may be particular to the function of the peripheral device 104, e.g., a hard disk or flash memory where the peripheral device 104 is configured as an NAS.

The memory 303 may include both volatile and non-volatile memory for storing both data and instructions. In this figure, a portion of memory 303 includes a computer readable medium 310 that stores functional modules. The medium 310 may include non-volatile memory such as magnetic disks, flash memory, read-only memory (ROM), etc., as well as volatile random access memory (RAM). The memory 303 may also include a second computer readable medium 312, which is represented here as firmware. The firmware medium 312 may be stored in a special location that is accessed by the peripheral device 104 upon boot up. The firmware medium 312 may include special provisions to protect operation of the device 106, such as making the medium 312 read only during normal operation, and validating some portion of the firmware stored in the medium 312 prior to use.

An example functional module 315 is shown in medium 310. This module 315 may include one or more programs that facilitate interfacing the peripheral device 104 with the portable device 106. For example, the module 315 may include a service interface 314 that provides the primary functions of the peripheral 104 (e.g., via service hardware 306) to the portable device 106 via a proximity network. Example primary functions of the peripheral device 104 were described in relation to portable device service interface 212 of FIG. 2, which is designed to operate together with service interface 314 of the peripheral device 104.

The module 315 also contains a maintenance interface 316 for interacting with a compatible maintenance interface (e.g., interface 214 in FIG. 2) of portable device 106. This interface 316 may provide functions as applying settings, confirming authentication, and other aspects of managing the peripheral device 104 that are not directly related to performance of its primary functions via service interface 314. The maintenance interface 316 can also be used for applying firmware updates to the firmware 312 as described herein. For example, the interface 316 may be configured, either alone or together with the service interface 314, as an API of the peripheral device 104 that facilitates applying firmware updates to the peripheral device 104 in response to the firmware updates being uploaded to the peripheral device 104.

The firmware update functionality of maintenance interface 316 is represented by example sub-modules 318, 320, and 322. A version control sub-module 318 may perform actions related to updates, such as tracking update history, maintaining a last "safe" version applied to firmware 312, communicating version information to the portable device 106, etc. The validation sub-module 320 may ensure integrity of files and metadata (e.g., by using checksums) received from portable device 106, and manage authentication between devices 104, 106 via a proximity network. Even though the portable device 106 may have its own provisions for ensuring integrity of the files received via an external network, the peripheral device 104 may perform its own checks to ensure no data corruption or unauthorized actions occur via the proximity network or via a compromised portable device 106. The validation sub-module 320 may also assist in assembling uploads/downloads of data from different sessions between the portable device 106 and peripheral device 104.

A firmware updater sub-module 222 manages the application of new updates to firmware 312. The firmware updater 322 may maintain safety mechanisms to ensure reliable updates, and to recover from a defective update. For example, the updater 322 may maintain two or more versions of firmware (e.g., factory version, last known good version, etc.) that may be alternatively accessed upon device boot. After a firmware update, the updater 322 may write a data value to a reserved location of non-volatile memory. This data indicates an update was just applied, and can be removed if the new version successfully boots. If this data value is still there after a subsequent reboot, it may be assumed the update has failed, and an older firmware version can be selected. In the alternate, the user can directly request a reset to an earlier version, e.g., via portable device 106 and maintenance interface 316, and/or activation of hardware (e.g., physical reset switch) coupled to I/O interface 304.

It should be noted that, as with the portable device 106, the maintenance interface 316 of the peripheral device 104 may operate cooperatively with or be integrated into the service interface 314. Examples of these cooperative operations are described above in relation to interfaces 212 and 214 of FIG. 2. This may or may not require interacting with service hardware 306. For example, if service hardware 306 includes rendering hardware (e.g., display, speaker), then data received via service interface 314 may be diverted via maintenance interface 316 to update sub-modules 318, 320, 322, e.g., upon detection of special codes or formats of the data. On the other hand, if the service hardware 306 includes persistent data storage (e.g., hard drive), then data received via service interface 314 may be directly sent to the hardware 306, where it can later be dealt with by the maintenance interface 316, and/or by other modules or sub-modules.

Figure 4:
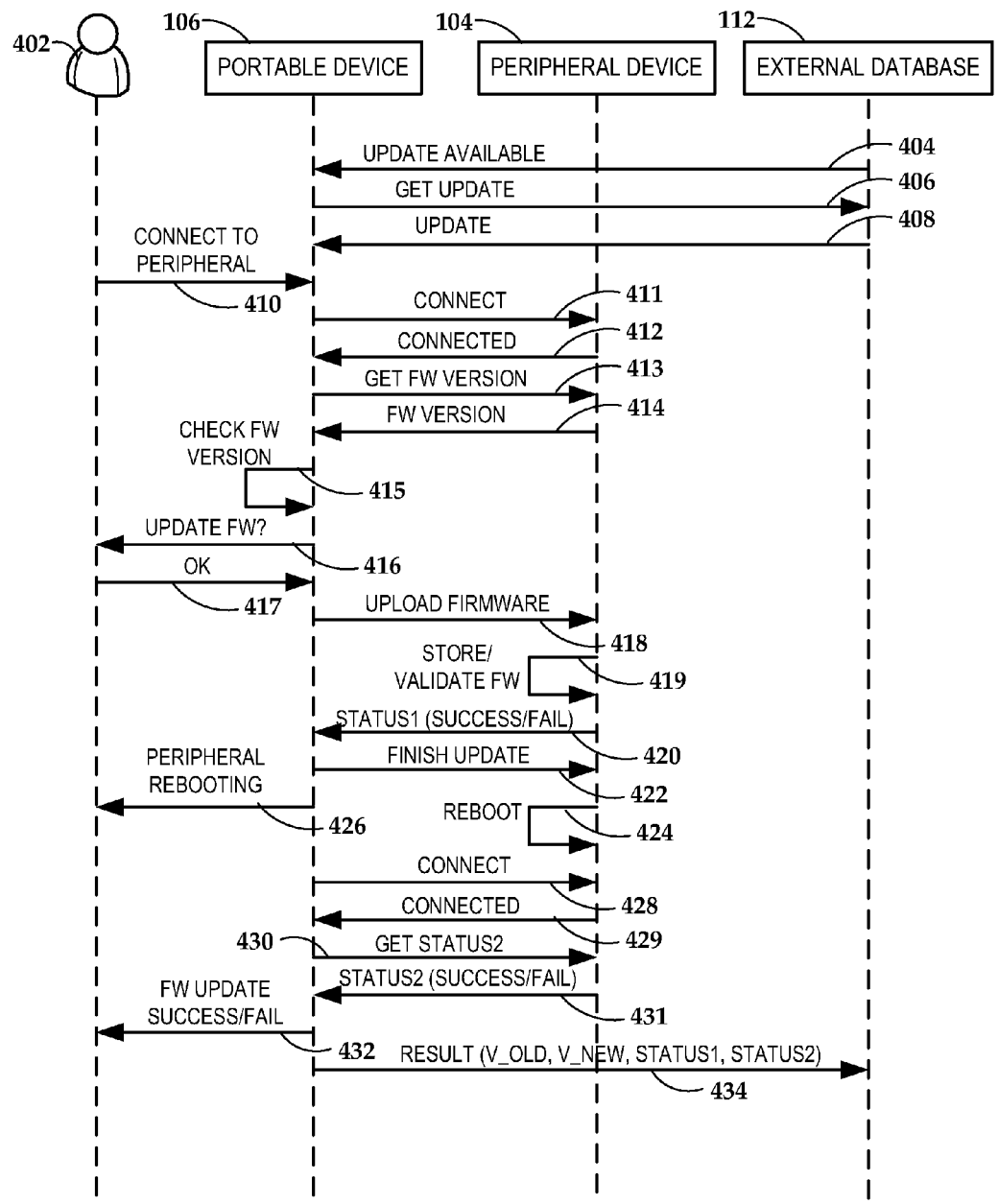

In reference now to FIG. 4, a sequence diagram illustrates a procedure for updating a peripheral device 104 according to an example embodiment. This procedure involves the previously described portable device 106, and external database 112. This procedure also involves a user 402 who interacts at least with portable device 106. In this example, the portable device 106 can receive a signal 404 regarding an available update (e.g., firmware update) for peripheral device 104. This signal 404 may be asynchronously communicated to the portable device 106 (e.g., push message) or may be in response to signal from the device 104 (e.g., polling).

Generally, in order to receive the initial signal 404, the portable device 106 may have been configured or otherwise received initial information about where the updates are available (e.g., a network address of database 112), what specific updates are needed (e.g., model/version of peripheral device 104), and how to access the updates (e.g., underlying data transfer protocols used, directory service or the like allowing a particular update to be found and obtained). Also pertinent to this example, the portable device 106 may also be configured with some mechanism that facilitates communicating status back to the database 112 for purposes of data collection and feedback. This initial information may be included in an application of the portable device 106, may be obtained via a network directory service, and/or may be obtained from the peripheral device 104.

Based on the initial information stored with or obtainable by the portable device 106, the device is able to take actions 406, 408 to obtain the update, e.g., downloading a file. In some cases, the update may be an initial update embedded in an application running on the portable device 106. In such a case, the user 402 obtains the application via 404, 406, 408, and the application extracts the update and applies it to the peripheral device 104 as described below.

Obtaining the update may also involve other actions described above but not shown here, such as authenticating the user 402 and/or portable device 106 to the database 112, assembly/validation of the downloaded file, storage of the file, etc. The checking for and obtaining of the download may occur at any time, e.g., as a background process, so that the user is not interrupted from using the portable device 106. In such a case, it may be necessary to ensure that the download operation 408 can occur over different sessions. This action 408 may interrupted for various reasons, such as to conserve battery power, free up computing resources, etc., on the portable device 106. Even where the update operations are performed under direct user control, it may still be useful to ensure download 408 can be interrupted and continued as needed, because a process having user focus may still need to be interrupted for similar reasons.

In this example, the updates are downloaded 408 and prepared without requiring any interaction between the portable device 106 and the peripheral device 104 to which the updates are targeted. In such a case, these updates need not be applied until the next time the devices 104, 106 connect 410-412, here in response to an express user request 410. After connection 412, the portable device 106 determines 413, 414 the current version of the update on the peripheral device 104, and checks 415 this version versus a version of the recently downloaded update 408. It is possible that some or all of these operations 413-415 may be performed prior to downloading of the update 408, as it may be unnecessary to download the update if the peripheral device 104 is already up to date, or if the user has defined a policy that makes the download 408 unnecessary. Nonetheless, there may be uses in checking 413-415 versions at this stage, such as double checking if the update is still needed (e.g., peripheral device 104 may have been updated from another device), logging the activity, recovery of a previous failed update, etc.

In this example, a query 416 is submitted to the user 402 prior to applying the update to the peripheral device 104. Assuming the user 402 responds 417 in the affirmative, the firmware can be uploaded 418 to the peripheral device 104, e.g., via a proximity network. As with the download 408, the upload 418 can be performed in parts, e.g., to conserve power and/or system resources. Generally, the user 402 may be requesting a connection 410 to the peripheral 104 because he/she wants to use the device 104. As such, it may be useful to allow the user 402 to continue to use the peripheral device 104 with minimal interruption after agreeing 417 to perform the update. As a result, the upload 418 may be throttled, delayed, interrupted, etc., so as not to impact the user's enjoyment of the peripheral device 104 for its intended purpose.

After the upload 418 is complete, the peripheral device 104 can store and validate 419 the update. This may involve assembly of downloaded fragments into a full file, verify checksums, etc. At this point, the peripheral 104 may communicate 420 a status of this stage of the upgrade to the portable device 106. This status data may be of interest to the user 402, the portable device 106, and/or the database 112. At this point, the peripheral device 104 is ready to apply the update.

In this example, the portable device 106 provides a signal 422 that informs the peripheral device 104 that it can apply the update, which may involve a soft reboot/reset 424 and communication of status 426 to the user 402. The reboot 424 can be triggered in other ways, however. For example, the peripheral device 104 may automatically apply the updates and reboot 424 after disconnecting from the portable device 106 and any other client devices. Or the updates may be installed the next time the peripheral device 104 is manually shut down and restarted by the user 402.

At some time after the update is installed and the peripheral reboots 424, the portable device again connects 428, 429, and at this time may query 430 for status 431. Results 431 of the query 430 may be communicated 432 to the user 402, as well as being optionally communicated 434 to the database 112. In this example, both the results 420 of the initial update 419 and the results 431 of additional steps 422, 424 may be communicated to the database 112 for purposes of tracking implantation and determining potential issues with the update.

Figure 5:
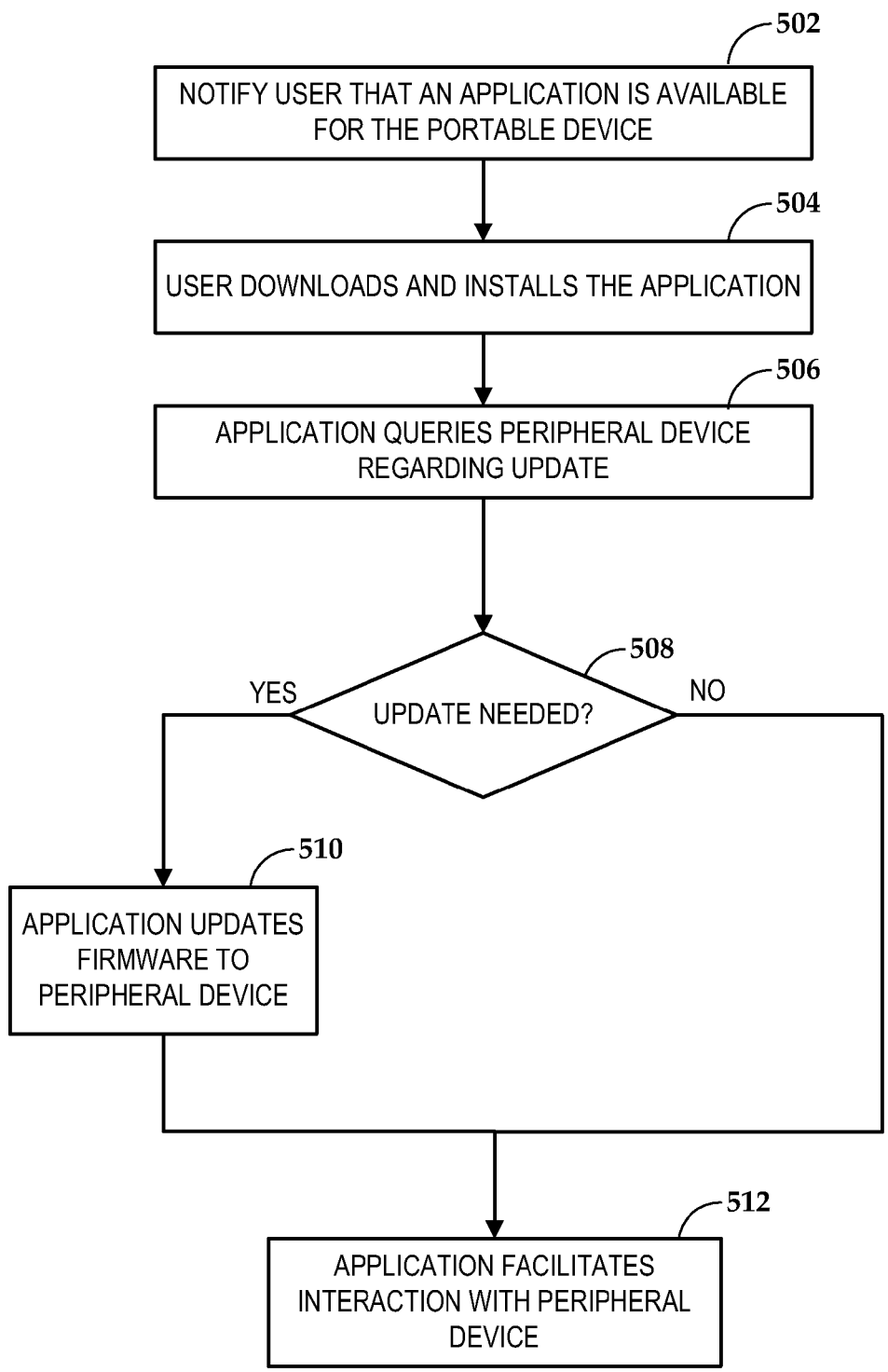
FIG. 5 is a block diagram of an apparatus according to an example embodiment.

In reference now to FIG. 5, a flowchart illustrates a procedure according to an example embodiment. A user is notified 502 that an application is available for a portable user device that provides access to a peripheral device. This application may or may not be required to use the peripheral device. For example, the peripheral device may be an NAS device that can be accessed using protocols already available on the portable device (e.g., SMB, NFS, etc.), however the application can provide additional capabilities not available via those native protocols.

The notification 502 can occur in a number of ways, including product packaging and/or data accessible on the peripheral device. For example, the peripheral device may include persistent storage (e.g., NAS) storing a user manual or other document that provides a link to obtain the application. In another arrangement, a URL that enables locating the application may be communicated to the portable device via near-field communication (NFC), bar codes, QR codes, etc., that can be provided on or with the peripheral device and activated via a sensor (e.g., NFC sensor, camera) on the portable device.

In response to the notification 502, the user can download and install 504 the application. The application may have the latest version of the firmware embedded within, and/or may have facilities to obtain the latest version, e.g., via an Internet data source. When the application is operating, it can query 506 the peripheral to determine whether an update is needed. If it is determined 508 that an update is needed, the application can update 510 the peripheral device. This update 510 may include informing the user of ongoing operations to facilitate understanding of why the peripheral is currently unavailable, that the peripheral is rebooting, etc. After the update 510 is completed, the application can facilitate 512 other interactions with the peripheral device, which may include configuration, management, and/or the special functions and services which the peripheral device provides.

Figure 6:
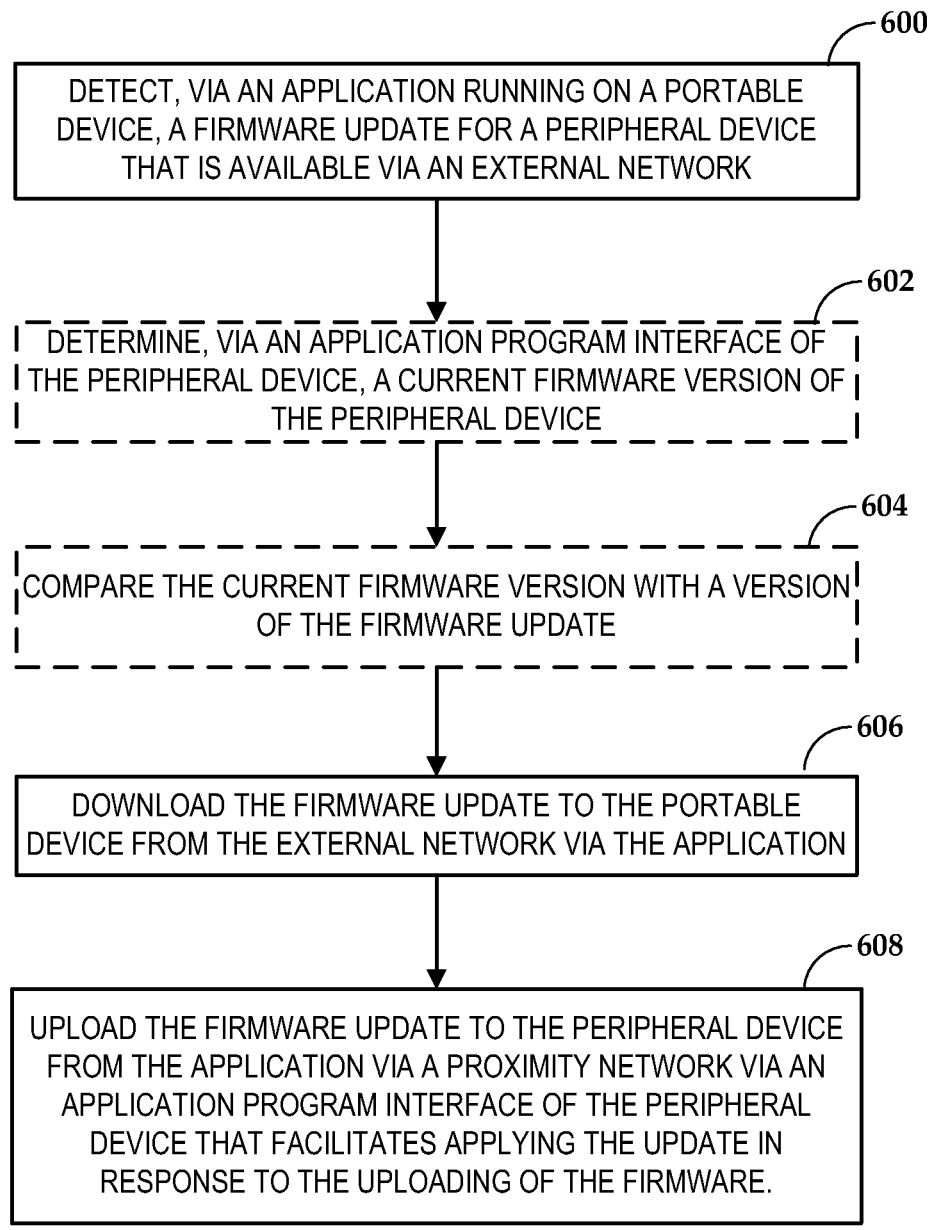
FIG. 6 is a flowchart illustrating a procedure according to an example embodiment.

In reference now to FIG. 6, a flowchart illustrates a procedure according to an example embodiment of the invention. An application running on a portable device detects 600 a firmware update for a peripheral device. The firmware update is available via an external network. The peripheral device may include a network attached storage device, and in such a case the application may facilitate user access to files stored on the network attached storage device. The peripheral device may lack the capability to access the external network. The detection 600 of the firmware update may occur in response to a user starting the application The procedure may further involve determining 602, via the application program interface of the peripheral device, a current firmware version of the peripheral device. In such a case the current firmware version may be compared 604 with a version of the firmware update. The firmware update is downloaded 606 to the portable device from the external network via the application. This download 606 may be in response to comparing 604 the current firmware version with the version of the firmware update. In one arrangement, the downloaded firmware update may be embedded in an application that utilizes the application program interface, and downloaded with the application. The firmware update is uploaded 608 to the peripheral device from the application via a proximity network. The firmware update may be uploaded via an application program interface of the peripheral device that facilitates applying the update in response to the uploading of the firmware.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used to facilitate connection of devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
causing an application of a portable device to use a network attached storage (NAS) device via a local area network;
detecting, in response to a user starting the application via the portable device, a firmware update for the NAS device, wherein the firmware update is identified, without user intervention, as being available via a data source of an external wide area network, and wherein the NAS device lacks a capability to directly access the external wide area network;
responsive to the detecting of the firmware update, authenticating the portable device with the data source and downloading the firmware update to the portable device from the external wide area network via the application, wherein at least one of the authenticating and the downloading occur automatically as a background process;
uploading the firmware update to the NAS device from the portable device via the local area network, wherein the firmware update is uploaded via an application program interface of the NAS device that facilitates applying the firmware update in response to the uploading of the firmware update; and
validating the firmware update and communicating a status of the firmware update to the user.

2. The method of claim 1, further comprising determining, via the application program interface of the NAS device, a current firmware version of the NAS device, wherein the downloading of the firmware update to the portable device and the uploading of the firmware update to the NAS device occurs in response to comparing the current firmware version with a version of the firmware update.

3. The method of claim 1, wherein the local area network comprises a wireless local area network, and wherein the NAS device is configured as an access point of the wireless local area network.

4. A non-transitory, computer-readable medium storing instructions executable to cause a portable device to:
use a network attached storage (NAS) device via a local area network;
detect, in response to a user starting an application via the portable device, a firmware update for the NAS device, wherein the firmware update is identified, without user intervention, as being available via a data source of an external wide area network, wherein the NAS device lacks a capability to directly access the external wide area network;
responsive to the detecting of the firmware update, authenticate the portable device with the data source and download the firmware update to the portable device via the external wide area network, wherein at least one of the authenticating and the downloading occur automatically as a background process;
upload the firmware update to the NAS device from the mobile device via the local area network, wherein the firmware update is uploaded via an application program interface of the NAS device that facilitates applying the firmware update in response to the uploading of the firmware update; and
validate the firmware update and communicate a status of the firmware update to the user.

5. The computer-readable medium of claim 4, wherein the application facilitates user access to files stored on the NAS device.

6. The computer-readable medium of claim 4, wherein the application is further operable to cause the portable device to determine, via the application program interface of the NAS device, a current firmware version of the NAS device, wherein the downloading of the firmware update to the portable device and the uploading of the firmware update to the NAS device occurs in response to comparing the current firmware version with a version of the firmware update.

7. A method comprising:
- coupling a network attached storage (NAS) device to a portable device via a local area network;
- facilitating user access to files stored on the network attached storage device via the local area network using an application program interface (API) of the NAS device;
- detecting, via the portable device in response to a user starting an application of the portable device, a firmware update for the NAS device available via a data source of an external wide area network, wherein the firmware update is identified without user intervention and wherein the NAS device lacks a capability to directly access the external wide area network;
- determining, via the API of the NAS device, a current firmware version of the NAS device;
- in response to comparing the current firmware version with a version of the firmware update, authenticating the portable device with the data source and downloading the firmware update to the portable device via the external wide area network, wherein at least one of the authenticating and the downloading occur automatically as a background process;
- uploading the firmware update to the NAS device from the portable device via the local area network, wherein the API of the NAS device facilitates applying the firmware update to the NAS device in response to the uploading of the firmware update; and
- validating the firmware update and communicating a status of the firmware update to the user.

8. The method of claim 7, wherein the NAS device is configured as a wireless local area network access point.

9. The method of claim 7, wherein the API facilitates user access to files stored on the NAS device.

\* \* \* \* \*